United States Patent
Pfeiffer et al.

(10) Patent No.: US 8,112,170 B2
(45) Date of Patent: Feb. 7, 2012

(54) METHOD AND SYSTEM FOR MACHINING PROCESS CONTROL

(75) Inventors: John Pfeiffer, Lebanon, OH (US); Paul A. Domas, Cincinnati, OH (US); Richard G. Menzies, Schenectady, NY (US); Joseph C. Kulesa, West Chester, OH (US); James A. Worachek, Glendale, OH (US); Walter Douglas Howard, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 12/114,435

(22) Filed: May 2, 2008

(65) Prior Publication Data

US 2009/0276074 A1    Nov. 5, 2009

(51) Int. Cl.
    G06F 17/00    (2006.01)
(52) U.S. Cl. ........ 700/110; 700/109; 700/108; 415/143; 415/178; 73/808
(58) Field of Classification Search .................. 700/110, 700/109, 108; 415/143, 178; 73/808
See application file for complete search history.

(56) References Cited

U.S. PATENT DOCUMENTS

| | | | |
|---|---|---|---|
| 5,917,726 A | 6/1999 | Pryor | |
| 6,415,191 B1 | 7/2002 | Pryor | |
| 7,171,897 B2 | 2/2007 | Barajas et al. | |
| 2002/0017144 A1* | 2/2002 | Miles et al. | 73/808 |
| 2004/0009060 A1* | 1/2004 | Romani et al. | 415/143 |
| 2006/0009865 A1 | 1/2006 | Goldfine et al. | |
| 2006/0259259 A1 | 11/2006 | Rozenboim et al. | |
| 2008/0015827 A1* | 1/2008 | Tryon et al. | 703/2 |

* cited by examiner

*Primary Examiner* — Kakali Chaki
*Assistant Examiner* — Tejal Gami
(74) *Attorney, Agent, or Firm* — David J. Clement, Esq.; Armstrong Teasdale LLP

(57) ABSTRACT

A method and system for controlling machining processes are provided. The system includes a computer system communicatively coupled to a database. The computer system is configured to receive data relating to manufactured part processes, identify at least one machining process used to manufacture a part and a parameter of the at least one machining process, receive survey data relating to the manufacturing process parameters used during the at least one machining process, and receive identification data for the manufactured part. The computer is further configured to receive data relating to a design of experiment (DOE), determine an low cycle fatigue (LCF) life distribution, identify process parameters that affect the LCF, and determine an allowable range for each identified process parameters for safe operation. The computer system is further configured to output the process window embodied in a specification associated with at least one of the part and the process.

6 Claims, 3 Drawing Sheets

METHOD AND SYSTEM FOR MACHINING PROCESS CONTROL

BACKGROUND OF THE INVENTION

This invention relates generally to manufactured parts and, more particularly, to a method and a system for controlling processes used to manufacture such parts.

At least some known conventional machining processes can degrade the material properties of a manufactured part if the machining process parameters are not controlled to prevent such degradation. The degradation in material properties can reduce the fatigue life of the part such that the part does not meet the design intent.

Currently, control of the manufacturing processes is performed using operator experience and/or manufacturing best practices documents. These documents may be based on known past failures and updates to those documents may be based on field experience in an attempt to prevent future failures. However, such subjective and non-comprehensive adjustments to processes to overcome failures is time-consuming and prone to inaccuracy.

BRIEF DESCRIPTION OF THE INVENTION

In one embodiment, a system for controlling machining processes includes a database for storing information and a computer system communicatively coupled to the database. The computer system includes a processor and the computer system is configured to receive data relating to manufactured part processes and process evaluation testing. The computer is further configured to identify at least one machining process used to manufacture a part that can impact a life of the part using at least one of an application procedure of the at least one machining process and a parameter of the at least one machining process to determine an available range of the parameter. The computer system is further configured to receive survey data relating to the manufacturing process parameters used during the at least one machining process wherein the survey data includes manufacturing processes and manufacturing process parameters used by manufacturing sources throughout the supply chain for manufacturing the part and a range of the manufacturing process parameters used during the process. The computer system is further configured to receive identification data for the manufactured part that is potentially impacted by the at least one machining process and receive data relating to a feature specimen low cycle fatigue (LCF) design of experiment (DOE) wherein multiple manufacturing processes and associated process parameters are evaluated simultaneously wherein the DOE includes at least one of a specimen design, a life correction for specimen geometry, and a material pedigree. The computer system is further configured to determine an LCF life distribution by evaluating at least one of the part and the machining process at a plurality of sets of process parameter conditions, identify process parameters that affect the LCF performance, and determine an allowable range for each identified process parameters for safe operation wherein safe operation refers to operation of the part within which acceptable low cycle fatigue results are achieved. The computer system is further configured to analyze using procedures and statistical tools the identified process parameters and the determined allowable range using a process measurement statistic, to rate each process using the process measurement statistic, and to determine a part process window based on the LCF results using a process capability statistical method for determining the acceptability of each set of process parameters. The part process window includes allowable ranges of process parameters to be used during the machining process. The computer system is further configured to output the process window embodied in a specification associated with at least one of the part and the process.

In another embodiment, a method of controlling machining processes includes determining a population of manufactured parts having a life affected by a machining process, determining the machining processes associated with each of the determined parts, and determining a process parameter of the machining process that affects a life of each part. The method further includes determining an influence on a life of each part by the determined process parameters and outputting an allowable range of each process parameter for each determined part.

In yet another embodiment, a manufacturing process control system includes a database for storing information and a computer system communicatively coupled to the database. The computer system is further configured to receive part data relating to a plurality of manufactured parts, the part data including a property of material of the part, a life of the part, and an environment of the part during use and receive manufacturing process data relating to one or more machining processes performed on each of the plurality of manufactured parts, the process data including information regarding parameters of the process that potentially affect a life of the part. The computer system is further configured to analyze the information using a feature specimen low cycle fatigue (LCF) design of experiment (DOE) wherein data from the one or more manufacturing processes and associated parameters of the process are evaluated simultaneously, the DOE includes at least one of a specimen design, a life correction for specimen geometry, and a life correction for material pedigree. The computer system is further configured to determine an LCF life distribution by evaluating at least one of the part and the machining process at a plurality of sets of process parameter conditions, identify process parameters that affect the LCF using the analyzed information, and determine an allowable range for the identified process parameters for safe operation wherein safe operation refers to operation of the part within which acceptable full cycle fatigue results are achieved. The computer system is further configured to analyze the identified process parameters and the determined allowable range using a process measurement statistic, rank each process using the process measurement statistic, and determine a part process window based on the LCF results using a process capability statistical method for determining the acceptability of each set of process parameters, the part process window includes allowable ranges of process parameters to be used during the machining process. The computer system is further configured to output the process window embodied in a specification associated with at least one of the part and the process.

BRIEF DESCRIPTION OF THE DRAWINGS

FIG. 1 is a simplified block diagram of an exemplary system in accordance with one embodiment of the present invention;

FIG. 2 is an expanded block diagram of an exemplary embodiment of a server architecture of a system in accordance with one embodiment of the present invention; and FIG. 3 is a flow chart of an exemplary method of managing machine processes in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of manufacturing and process control in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
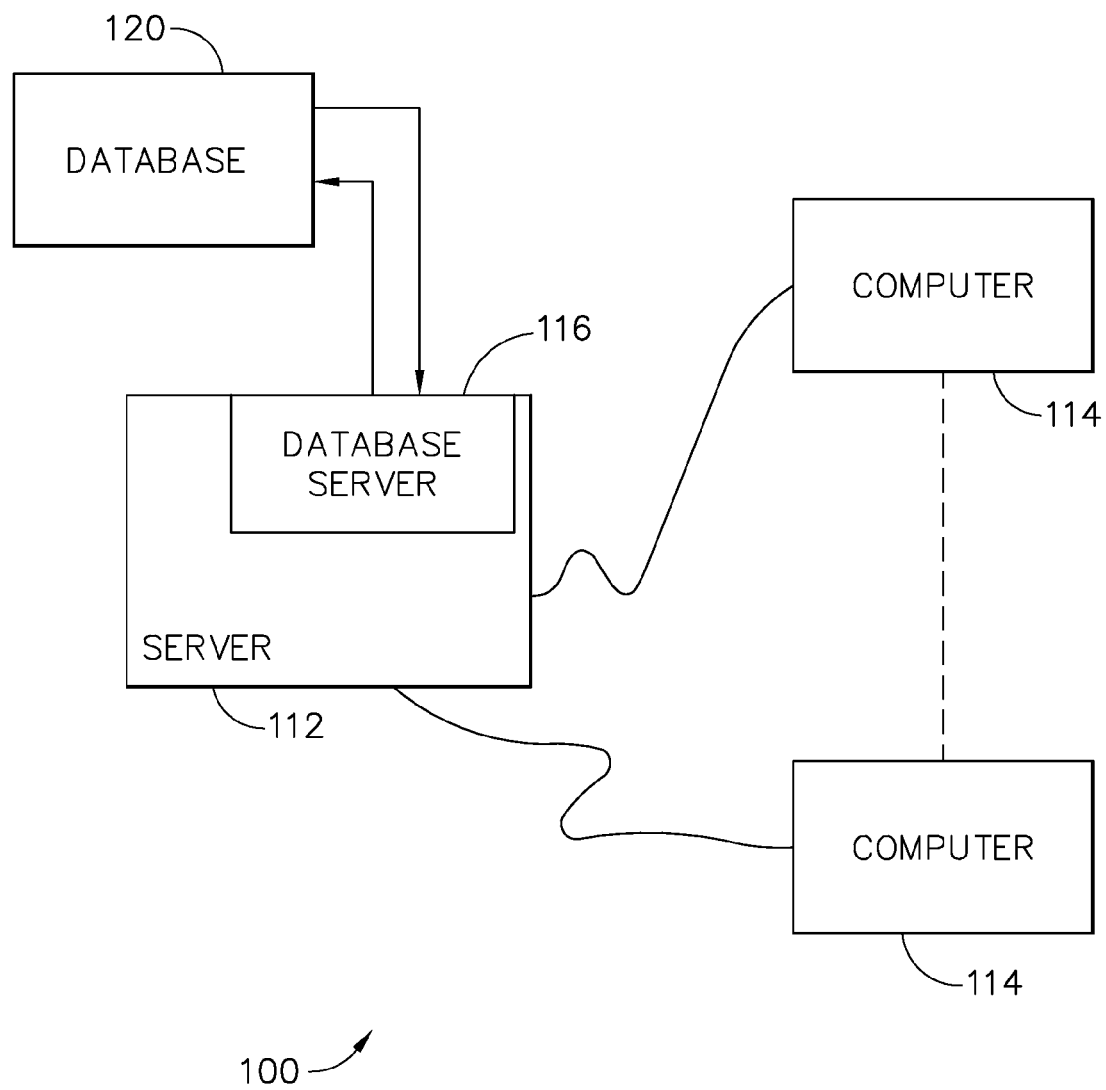
FIGS. 1-3 show exemplary embodiments of the method and system described herein.

FIG. 1 is a simplified block diagram of an exemplary system 100 in accordance with one embodiment of the present invention. System 100 is a machining process control system, which can be utilized by users to facilitate maintaining objective controls on manufacturing processes as described below.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment. A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store manufactured part data, machine process data for processes that the manufactured parts may be subjected to during the manufacturing process, test data relating to test pieces subject to a testing procedure, analysis data that relates the test data to the manufactured part data and the machine process data, and process window data that limits process parameters used during the manufacturing process.

Figure 2:
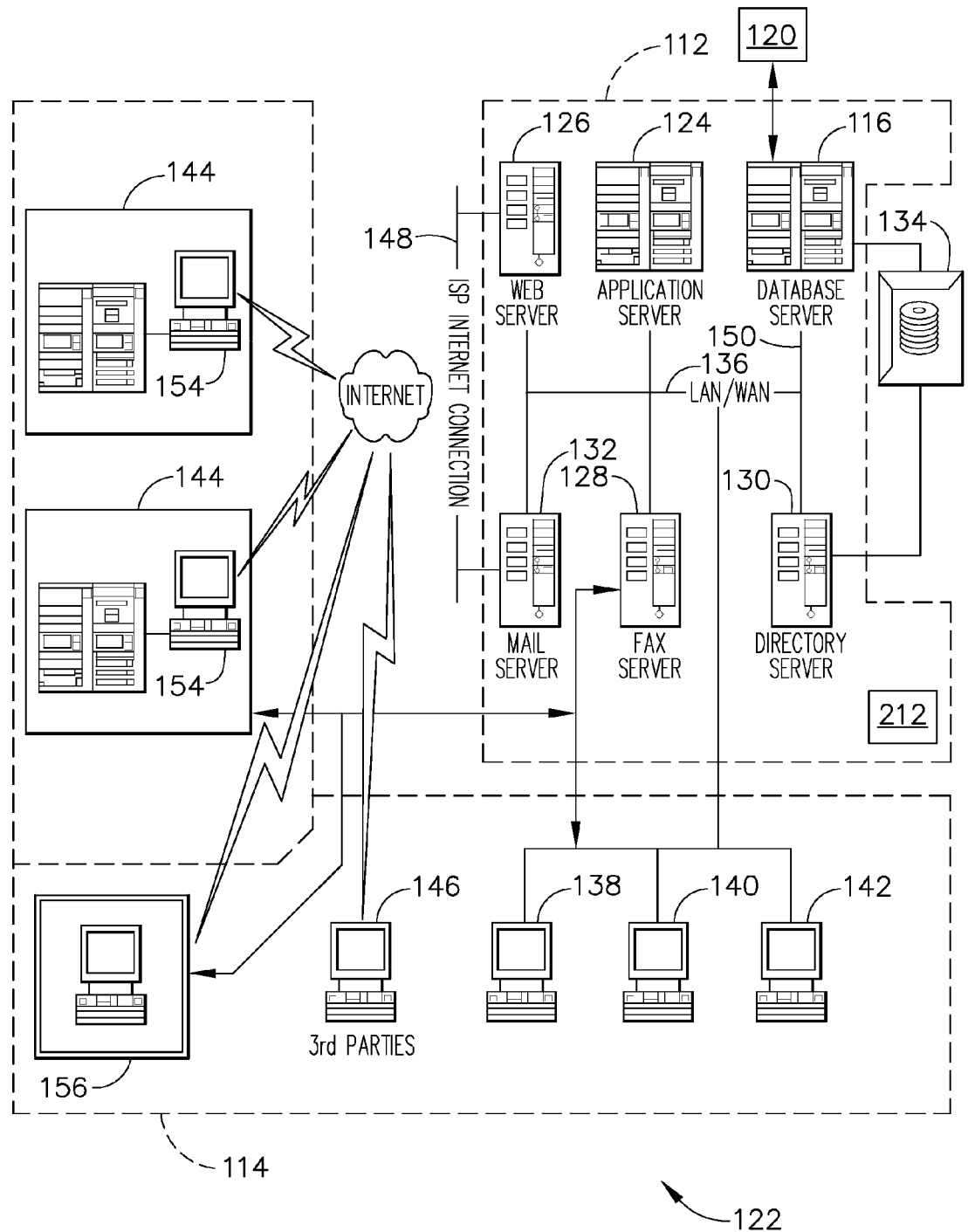

FIG. 2 is an expanded block diagram of an exemplary embodiment of a server architecture of a system 122 in accordance with one embodiment of the present invention. Components in system 122, identical to components of system 100 (shown in FIG. 1), are identified in FIG. 2 using the same reference numerals as used in FIG. 1. System 122 includes server system 112 and client systems 114. Server system 112 further includes database server 116, an application server 124, a web server 126, a fax server 128, a directory server 130, and a mail server 132 operable and/or accessible using one or more processors 212. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., suppliers, customers, regulators, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
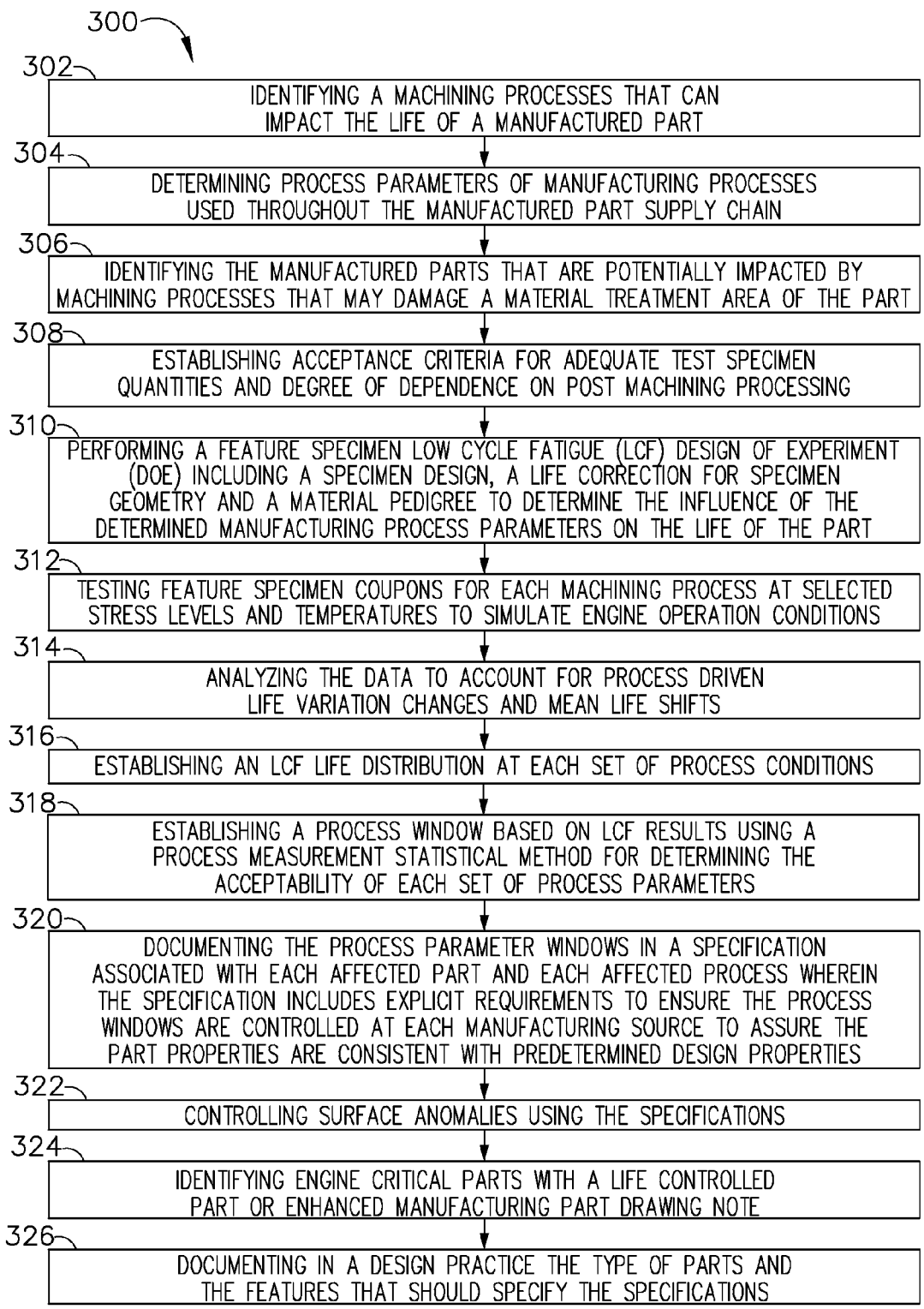

FIG. 3 is a flow chart of an exemplary method 300 of managing machine processes in accordance with an exemplary embodiment of the present invention. A process is a unique combination of cutting tool geometries, cutting tool materials, cutting fluid applications, and machining parameters used to control the tools and materials that are used in producing a measurable output, for example, a manufacturing line for fabricating parts. The processes have inherent statistical variability which can be evaluated by statistical methods. In the exemplary embodiment, method 300 further provides for establishing and controlling a machining process window. As used herein, a process window refers to limits on one or more parameters that define the process steps in a manufacturing process. For example, a parameter relating to a drilling process may be a rotating speed of a drill bit used in the drilling process. A process window may describe an acceptable range of drill bit speed. The process window may take into account several parameters that relate interdependently to the manufacturing process. For example, in the drilling process, it may be possible to increase the speed of the drill bit if lubricating oil is supplied to the bit during drilling. The process window describes the allowable ranges of the various parameters that may affect the outcome of one or more of the manufacturing processes.

Method 300 includes identifying 302 machining processes that can impact a life of a manufactured part. Some machining processes are known to be able to damage a material treatment of the part. For example, the microscopic structure of a metallic part may be changed due to the machining process in such a way as to affect the performance of the part in service. The application procedure of machining processes that are known to be used in fabricating the part is reviewed. The review determines which processes are able to adversely affect the material properties the part. The parameters of the process are reviewed to determine available ranges of those parameters that may be used during the process. This identification 302 may be performed for each part in a population of parts of interest or may be performed for individual parts that are entered into the population of interest.

Processes that are used on features of the part that are not prone to failure may not be reviewed. Historical data may be used to ascertain particular parts that have a history of failing and the failure mode(s) of the part in various applications. Historical data of, for example, similar or identical parts that are used in different applications having different environmental conditions may be used to associate a process with a particular mode of failure. The failure mode may also be indicative of a failure caused by a manufacturing process rather than other reasons for a failure.

The manufacturing processes are surveyed 304 to determine manufacturing process parameters used during each process. The manufacturing processes and manufacturing process parameters are surveyed throughout the supply chain for the part. A significant number of supplier processes are surveyed to ensure the extent of variation of process parameters among vendors supplying parts is known and can be further evaluated. Heretofore, different vendors may supply parts wherein process parameters are not consistent among the vendors. Embodiments of the present invention ensure each vendor supplies parts formed using processes that have been evaluated for their impact to the material properties of the part and the parameters of the process have been determined to substantially eliminate material property damage due to the machining process. The manufacturing process survey permits understanding of the breadth of current manufacturing technology for any particular process so that ranges of parameters being used can be evaluated.

Method 300 includes identifying 306 the manufactured parts that are potentially impacted by a machining processes that may reduce a material property in a critical area of the part. The identification 306 is applied to parts that have an area of the part that is important for the material property to remain intact and that area is affected by the machining process. Each machining process may affect multiple parts. For example, many different parts are affected by a drilling process. Some of the parts affected by the drilling process may also be affected by a milling process. The cumulative affects of the various processes used to machine the part are evaluated. Acceptance criteria for adequate test specimen quantities and degree of dependence on post machining processing, for example, shot peening, are also established 308.

Method 300 includes performing 310 a feature specimen low cycle fatigue (LCF) design of experiment (DOE) with multiple manufacturing processes and associated parameters (feeds, speeds, tool wear and depth of cut). In the exemplary embodiment, the DOE includes a specimen design, a life correction for specimen geometry, and a life correction for material pedigree.

Process parameters that affect the LCF or life of the part are identified. The identified parameters are typically different for each machining process. For example, in a drilling process, the parameter, cutting speed is important, but in a broaching process, the parameter, cutting speed may not be important. In a further example, in the drilling process, coolant application is important, but in the broaching process, the tool geometry is important. Of all the potential variables in all of the determined processes, for example but not limited to, drilling, broaching, milling, edge breaking, or turning the parameters that can damage the part if not controlled is determined.

After the parameters that could impact the part are identified, the allowable range for each of those parameters for safe operation is determined. As used herein, safe operation refers to operation within which acceptable full low cycle fatigue results are achieved. In a case where, for example, three parameters are identified as being important, the allowable range where all three parameters are safe simultaneously needs to be determined. Statistical analysis is used to ensure the process is safe within that range.

A process measurement statistic is used to analyze the process evaluation data and the results of the evaluation. Each process is rated using the process measurement statistic. The process measurement statistic is a measurable property of a process with respect to the low cycle fatigue performance baseline and may be expressed as a process measurement index. If the process ranking is greater than a predetermined index number, that process is deemed to be a robust process. If the process rating is slightly below the predetermined index number, the process is evaluated further to validate whether it is a robust process, and if the process rating is lower than the predetermined index number, the process is deemed to be not a robust process.

In the exemplary embodiment, test coupons are used to perform 312 low cycle fatigue experiments. For each process, certain parameters are held constant and others are varied while the process is performed on a test specimen. Statistical analysis is used to validate that the specimen design accurately represents each part that is subject to that process during manufacture. Additionally, a life correction is determined to account for differences between the geometry of the test specimen and the actual part. A material pedigree for the specimen tested is calculated to account for variability in material properties between material samples used to manufacture each specimen and part. Furthermore, testing at various stress levels and temperatures is performed. The stress levels and temperatures are selected to appropriately address gas turbine engine operating conditions. Testing may be performed with and without post-processing typical of part manufacture.

The resulting test data is analyzed 314 to account and correct for process driven life variation changes and mean life shifts. A mean life shift is a metric that indicates how close the average or mean of the evaluation results are with respect to a standard. The process-driven life variation is a metric that measures the variability of the results with respect to the variability of a standard reference population. These two metrics are used to express whether the machined parts are better or worse than the standard and by how much. For example, a the results of an evaluation of a plurality of parts may indicate that, on average, the machined specimen parts are only slightly worse than the standard, however further analysis of the parts may reveal that although some of the specimens meet the standard, the variability amongst the test results is great and thus others of the parts are significantly substandard. In many cases, having any substandard results renders the process substandard regardless that most parts are within standard tolerances. The mean life and life variation used together provide an accurate evaluation of the process performance. Method 300 includes establishing 316 an LCF life distribution at each set of process conditions.

Method 300 also includes determining 318 a part process window based on the LCF results using a process capability statistical method for determining the acceptability of each set of process parameters. A part process window includes allowable ranges for process parameters used during fabrication of the part. The part window may include conditional ranges for some parameters based on the parameter range of other parameters in the same process.

When the acceptable process window for all the controllable parameters that affect the material condition of each part is determined, the process window is embodied 320 in a specification for that machining process as applied to specific part features. In the exemplary embodiment, the specification is associated with each process for that part using a part drawing. The specifications include specific requirements to ensure these process windows are controlled at the manufacturing source to assure the part properties are consistent with the LCF design properties. The specifications may include restrictions for parameters not to exceed and on how a process is performed. The restrictions substantially prevent the process from creating material damage to the part. Surface anomalies are controlled 322 using the specifications. A part that is manufactured in accordance with a process other than that described in the specification for that part cannot be considered identical to or a replacement for a part that has been manufactured using the specified processes as noted in the part drawing specification. Critical engine parts are identified 324 with a life controlled part or enhanced manufacturing part drawing note. The type of parts and the features that should specify the specifications are documented 326 in a design practice document.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 212, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is the use of controlled manufacturing processes produce hardware that is consistent with the design intent and the material properties required by a standard lifing methodology Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of controlling machining processes provides a cost-effective and reliable means for use of controlled manufacturing processes to produce hardware that is consistent with the design intent and the material properties required by a lifing methodology. More specifically, the methods and systems described herein facilitate ensuring parts whose life may be impacted by a manufacturing process and all manufacturing processes that are used with that part are identified and evaluated. In addition, the above-described methods and systems facilitate controlling the parameters of procedures used in the processes using specifications that define the part such that parts that are not manufactured using the specification are not considered identical or replacement parts. As a result, the methods and systems described herein facilitate controlling machining processes in a cost-effective and reliable manner.

While the disclosure has been described in terms of various specific embodiments, it will be recognized that the disclosure can be practiced with modification within the spirit and scope of the claims.

What is claimed is:

1. A system for controlling machining processes to assure the reliability of the machined surface, said system comprising:
    a database for storing information; and
    a computer system communicatively coupled to said database, said computer system comprising a processor, said computer system configured to receive data relating to manufactured part processes and specimen testing, said computer further configured to:
        identify at least one machining process used to manufacture a part that damages a material treatment of the part during the machining process and impacts a service life of the part using at least one of an application procedure of the at least one machining process and at least one parameter of the at least one machining process to determine an available range of the parameter;
        evaluate survey data relating to the manufacturing process parameters used during the at least one machining process, the survey data including manufacturing processes and manufacturing process parameters used by vendors throughout the supply chain for manufacturing the part and a range of the manufacturing process parameters used during the process;
        receive identification data for the manufactured part that is potentially impacted by the at least one machining process;
        evaluate data relating to a feature specimen low cycle fatigue (LCF) design of experiment (DOE) wherein multiple manufacturing processes and associated process parameters are evaluated simultaneously, the DOE includes at least one of a specimen design, a life correction for specimen geometry, and a life correction for material pedigree;
        determine an LCF life distribution by evaluating at least one of the part and the machining process at a plurality of sets of process parameter conditions, identify process parameters that affect the LCF performance;
        determine an allowable range for each identified process parameters for safe operation wherein safe operation refers to operation of the part within which acceptable low cycle fatigue results are achieved;

analyze the identified process parameters and the determined allowable range using a process measurement statistic;

rate each process using the process measurement statistic;

determine a process parameter window based on the LCF results using a process capability statistical method for determining the acceptability of each set of process parameters, the part process window includes allowable ranges of process parameters to be used during the machining process;

output the process window embodied in a specification associated with at least one of the part and the process, the specification including allowable ranges of process parameters to be used to control machine tools during the machining process; and wherein said computer is further configured to receive test data for the specimen, the test data including material property data from testing at a plurality of stress levels and temperatures selected to simulate gas turbine engine operating conditions.

2. A system in accordance with claim 1 wherein said computer is further configured to:

account and correct for process driven life variation changes and mean life shifts wherein the mean life shift comprises a metric that indicates the proximity of the average or mean of the evaluation results with respect to a standard and wherein the process driven life variation is a metric that indicates variability of the results with respect to the variability of a standard reference population; and determine an acceptance criteria for adequate test specimen quantities and a degree of dependence on post machining processing.

3. A system in accordance with claim 1 wherein said computer is further configured to statistically validate the determined process parameters to determine a relative contribution of each process parameter when more than one process parameter is present to affect a life of the part.

4. A system in accordance with claim 1 wherein said computer is further configured to at least one of validate that a specimen design accurately represents each part that is subject to that process during manufacture, correct a life determination to account for a difference between a geometry of the specimen and the part, and evaluate a material pedigree of the specimen with respect to the part.

5. A manufacturing process control system comprising:

a database for storing information; and a computer system communicatively coupled to said database, said computer system configured to:

receive part data relating to a plurality of manufactured parts, said part data including a property of material of the part, a life of the part, and an environment of the part during use;

receive manufacturing process data relating to one or more machining processes performed on each of the plurality of manufactured parts, the process data including information regarding parameters of the process that damages a material treatment of the part during the machining process and potentially affect a life of the part;

evaluate survey data relating to the manufacturing process parameters used during the at least one machining process, the survey data including manufacturing processes and manufacturing process parameters used by vendors throughout the supply chain for manufacturing the part and a range of the manufacturing process parameters used during the process;

analyze the information using a feature specimen low cycle fatigue (LCF) design of experiment (DOE) wherein data from the one or more manufacturing processes and associated parameters of the process are evaluated simultaneously, the DOE includes at least one of a specimen design, a life correction for specimen geometry, and a life correction for material pedigree;

determine an LCF life distribution by evaluating at least one of the part and the machining process at least one of a plurality of sets of process parameter conditions and low cycle fatigue test conditions;

identify process parameters that affect the LCF life of the specimens using the analyzed information;

determine an allowable range for the identified machining process parameters for safe operation wherein safe operation refers to operation of the part within which acceptable low cycle fatigue results are achieved;

analyze the identified process parameters and the determined allowable range using a process measurement statistic;

rate each process using the process measurement statistic;

determine a part process window based on the LCF results using a process capability statistical method for determining the acceptability of each set of process parameters, the part process window includes allowable ranges of process parameters to be used during the machining process;

output the process window embodied in a specification associated with at least one of the part and the process, the specification including allowable ranges of process parameters to be used to control machine tools during the machining process; and wherein said computer is further configured to receive test data for the specimen, the test data including material property data from testing at a plurality of stress levels and temperatures selected to simulate gas turbine engine operating conditions.

6. A system in accordance with claim 5 wherein said computer is further configured to statistically evaluate the identified process parameters to determine a relative contribution of an effect on the LCF of each process parameter when more than one process parameter is present to the affect of the life of each part.

* * * * *